P. SINCLAIR.
MACHINE FOR MAKING MANTLES.
APPLICATION FILED JULY 26, 1920.

1,391,515.

Patented Sept. 20, 1921.
3 SHEETS—SHEET 1.

Inventor
P. Sinclair.
By Geo. P. Kimmel.
Attorney

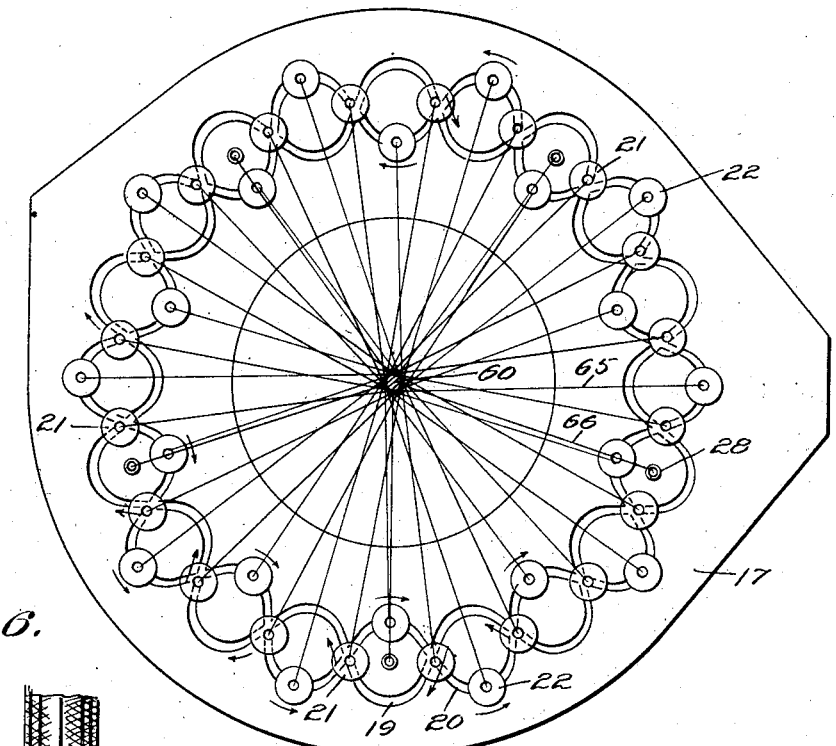
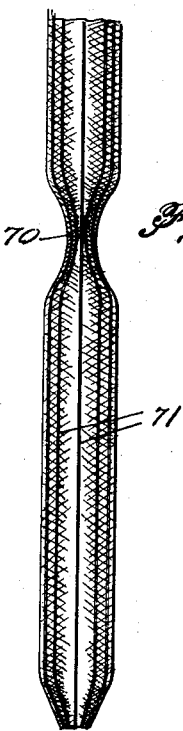
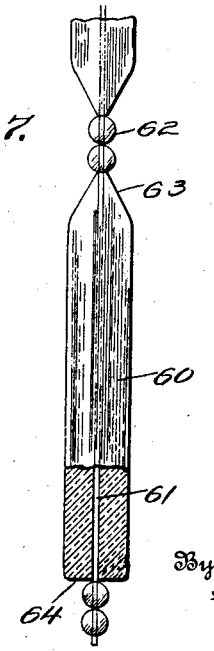
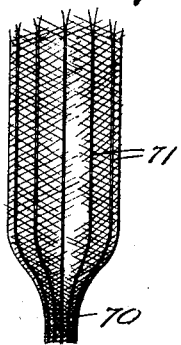

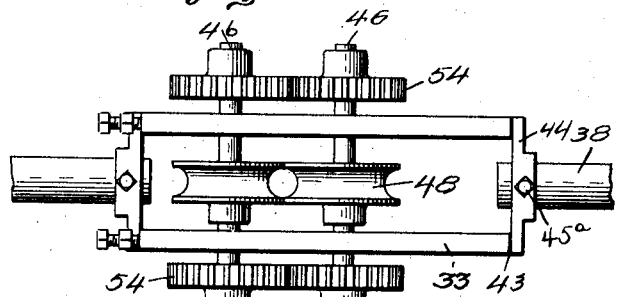
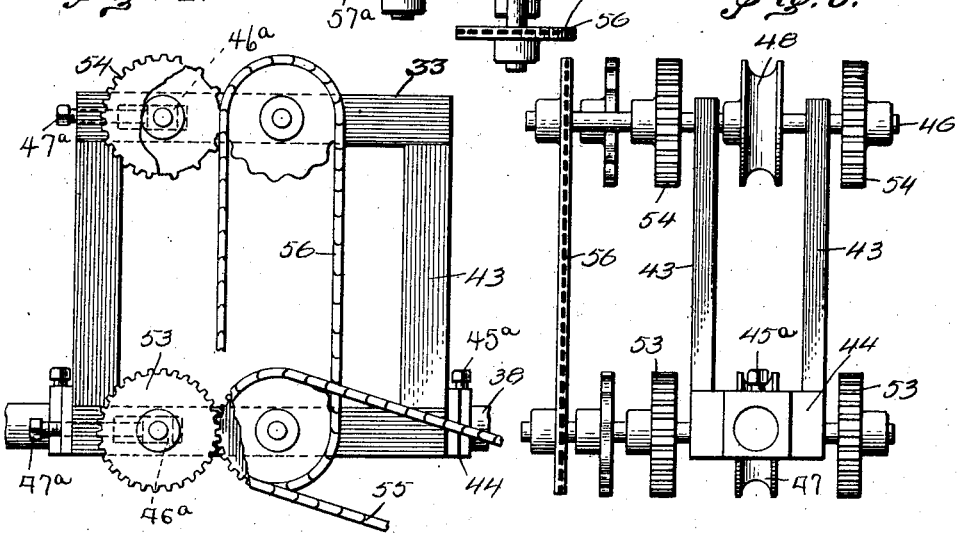
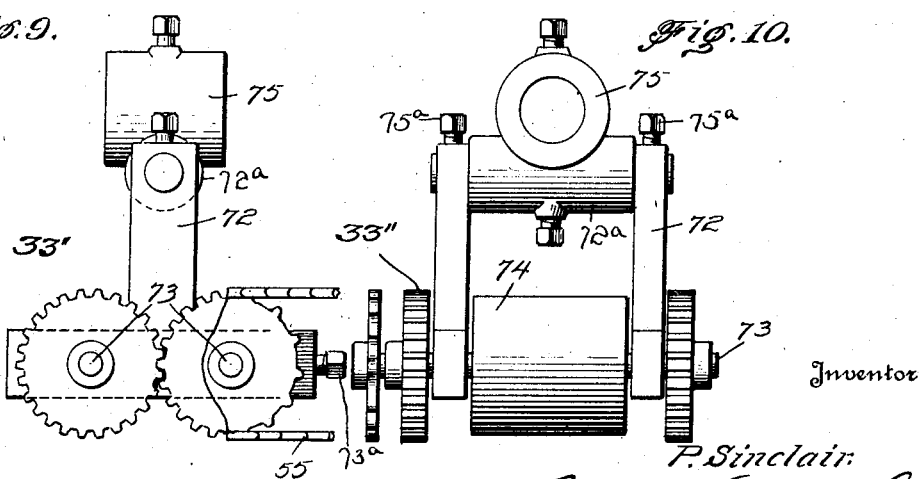

UNITED STATES PATENT OFFICE.

PAUL SINCLAIR, OF SOUTH WILLIAMSPORT, PENNSYLVANIA.

MACHINE FOR MAKING MANTLES.

1,391,515.     Specification of Letters Patent.   Patented Sept. 20, 1921.

Application filed July 26, 1920. Serial No. 398,989.

*To all whom it may concern:*

Be it known that I, PAUL SINCLAIR, a citizen of the United States, residing at South Williamsport, in the county of Lycoming and State of Pennsylvania, have invented certain new and useful Improvements in a Machine for Making Mantles, of which the following is a specification.

This invention relates to improvements in braiding machines and has for its object to provide an attachment for such machines capable of producing a tubular textile fabric braid which is restricted in diameter at uniformly spaced intervals to form a chain or series of connected mantle foundations or frame units adapted to be cut apart to provide the individual mantle frames each having a head suitably shaped to receive a supporting bail in such manner as to eliminate the usual gathering of the textile fabric at the top of the mantle where it is connected with the supporting bail.

A further object is the provision of a machine of this character in which permanency of the shape of the mantle forms or foundations is insured owing to the manner of braiding or weaving them upon a series of properly shaped and connected forms.

A further object is the provision of an attachment for braiding machines including means for maintaining the chain or series of forms in motion at a uniform speed during operation of the braiding machine.

With these and other objects in view, the invention consists in certain novel features of construction as hereinafter shown and described, and then specifically pointed out in the claims and in the drawings illustrative of the preferred embodiment of the invention.

Fig. 2 represents a diagrammatical plan view of the top plate of the braiding machine illustrating the guiding grooves and the relation of the bobbin carriers and warp guides.

Fig. 3 represents an enlarged plan view of the form feeding mechanism of the attachment.

Fig. 4 represents an enlarged side elevation thereof, partly broken away.

Fig. 5 represents an end elevation of the form feeding mechanism of the attachment.

Fig. 6 represents a side elevation of a fragment of the chain of mantle frames produced by the attachment.

Fig. 7 represents a fragmental side elevation, partly in section, of the series or chain of forms.

Fig. 8 represents a fragmental side elevation of one of the mantle frames or foundations subsequent to its detachment from its neighbor.

Fig. 9 represents a side elevation of a modified type of form feeding mechanism for the attachment.

Fig. 10 represents an end elevation of the modification, and,

Figure 1:
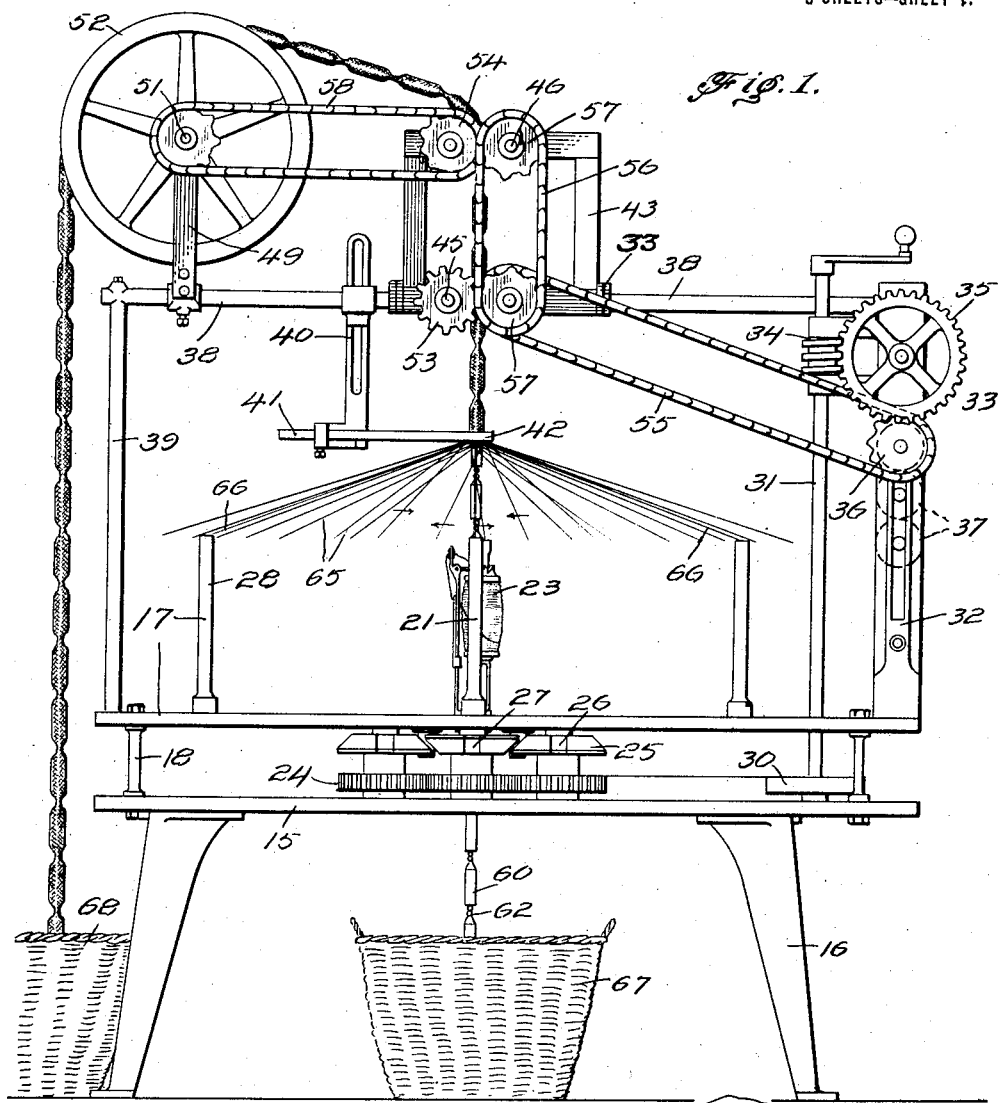
Figure 1 represents a side elevation of a braiding machine illustrating the attachment applied thereto.

Referring to the drawing in detail, wherein similar reference numerals designate corresponding parts throughout the several views, the numeral 15 indicates the usual bed plate of a conventional type of braiding machine which is supported upon legs 16 and supports a top plate 17 by spacing tie bolts 18. The top plate 17 is provided with the usual circuitous intersecting guide grooves 19 and 20 in which the feet of the oppositely moving sets of carriers 21 and 22, respectively are adapted to travel. As indicated by the arrows in Fig. 2, the group of carriers 21 travel in the groove 19 in a general clockwise direction whereas the carriers 22 of the other group move through the groove 20 in a general counter-clockwise direction. The carriers 21 and 22 support the usual bobbins 23 on which any preferred type of tensioning devices may be employed.

Between the superposed plates 15 and 17, is arranged a substantially annular series of intermeshing gear wheels 24 which are commonly known in the art as "horn gears" and are provided with top flanges 25 having notches 26 therein for receiving the drivers or pins 27 depending from the feet of the carriers 21 and 22. An adequate number of warp guides 28 is arranged upon the top plate 17 for receiving the warp threads, as will hereinafter appear.

One of the horn gears 24 meshes with a pinion 30 on the worm shaft 31 which latter is supported at its lower terminal in the bed plate 15 and is journaled adjacent its upper extremity in a bracket provided upon the supporting frame structure 32 of a take-up mechanism designated generally by the numeral 33'. The worm 34 of the shaft 31 is in mesh with a gear wheel 35 arranged in the frame structure 32 which drives the usual take-up rollers 37. These take-up rollers 37 are supplemental to another set of such rollers to be hereinafter more fully described, and are adapted for use when the latter set are not needed.

One of a pair of supporting bar sections 38 is supported upon the frame structure 32 and the other section is supported by an upright 39 mounted upon the top plate 17. The usual adjustable holder 40 for the former 41 is mounted upon one of the supporting bar sections 38 and is apertured at its extremity 42 to receive the filling and warp threads as the latter are interwoven in the operation of braiding.

The attachment for braiding machines of this type for producing mantle foundations or frames consists of a frame structure 43 the rectangular sides of which are connected by apertured spacing elements 44 mounted upon the adjacent terminals of the sections of the supporting bar 38 and secured in adjusted position thereon by set screws or equivalent devices 45ª.

Superposed pairs of horizontal shafts 45 and 46 are journaled in the frame 43 and support pairs of grooved companion rollers 47 and 48, respectively, the rollers of each pair being arranged in relatively close relation, as suggested in Fig. 3 to provide a vertical substantially circular aperture therebetween to accommodate the chain of forms upon which the tubular braid is produced, as will hereinafter appear, which assembly as a whole, provides for a main take-up mechanism designated generally as 33.

One of the shafts of each pair is mounted in an adjustable bearing 46ª which is secured in adjusted position by a screw 47ª whereby proper adjustment of the form feeding rollers may be effected.

At the side of the frame 43 opposite the take-up mechanism 33 a supporting bracket 49 is arranged upon one of the bar sections 38 and supports the shaft 51 carrying a rotating guide pulley 52.

Intermeshing pinions 53 and 54 are provided upon the terminal portions of the shafts 45 and 46, respectively, and operate to cause rotation of the rollers of each pair in opposite directions whereby a form positioned between said rollers will be moved upwardly or downwardly, according to the direction of rotation of the rollers.

Movement is transmitted from the take-up mechanism 33 to one of the lower roller supporting shafts 45 by a power transmitting chain 55 and synchronous movement of the superposed pairs of rollers 47 and 48 is effected by means of a chain 56 extending over sprocket wheels 57 arranged upon the shafts 45 and 46. A sprocket wheel 57ª is arranged upon the other upper shaft 46 and is connected by a chain 58 with the shaft 51 whereby the guide pulley 52 is operated during operation of the braiding machine.

The attachment also includes a flexible chain of forms 60 connected by a cable or other flexible element 61 passing through longitudinal bores formed in the several forms 60 and also through substantially spherical spacing elements 62 which are interposed between the forms 60 and maintain the latter in uniformly spaced relation. One end of each form is tapered as at 63 whereas the opposite end is square as at 64 and when the several forms are strung upon the flexible connecting member 61 the tapered extremities of the forms are disposed adjacent each other and likewise the square ends 64.

Several of the forms 60 are positioned upon a flexible connecting member 61 until a chain is provided which is of such length as to be conveniently handled and, as will be understood, the forms are preferably constructed of glass or such other material possessing a smooth surface.

The operation of a braiding machine equipped with the improved attachment is as follows: The terminals of the several filling threads 65 and warp threads 66 are connected together and pass vertically upward between the rollers 47 of the take-up mechanism 33, subsequent to passing such terminals through the apertured terminal of the former 42. As the braiding machine operates, the movement of the two groups of oppositely moving carriers 21 and 22 produces a tubular braid and when a relatively short length of such braid has been produced, the terminal form 60 of a group or chain assembled upon a flexible connecting element 61 is passed into the tubular braid, and, subsequent to removing the latter from between the rollers of the take-up mechanism 33, the form is guided upwardly between the lower and upper pairs of rollers 47 and 48 and over the guide pulley 52. For convenience in handling the empty chain of forms, a basket or other receptacle 67 is preferably provided which latter is placed underneath of the bed plate 15 of the machine during operation. A second or receiving basket 68 is also provided and is arranged below the guide pulley 52 for receiving the chain of forms together with the tubular braid. As the operation of the braiding machine is continued, the pairs of feed rollers 47 and 48 are constantly driven through the operating chains 55 and 56 and the chain of forms 60 is slowly moved upwardly through the braiding machine and over the guide roller 52, being finally delivered into the receiving basket 68. As the forms pass through the former 42, the threads are plaited thus forming a continuous tubular braid. It will be observed that the spacing elements 62 are of considerably less size than the forms 60 and consequently that portion of the braid which is formed upon the spacing elements and the reduced extremities 63 of the forms is accordingly restricted in diameter.

When the entire chain of forms has been completely inclosed by the tubular braid it is removed from the machine and the braid is severed at the several points between the forms 60, the knife or other implement used to cut the braid being also utilized to sever the flexible connecting member 61 at the several points between the forms 60. The forms are separately removed from the severed sections of the braid, the relatively large or square terminals 64 of the forms being first withdrawn.

When the tubular braid has been thus cut up into a plurality of sections, each section has the approximate form suggested in Fig. 8 and constitutes a foundation or frame structure for an incandescent gas mantle. Owing to the restricted portion 70 at each terminal of the frame or foundation a head and neck portion for attachment to the supporting bail of the mantle is provided which is without any folds or gatherings whatever and owing to the incorporation of the warp threads 71 into the fabric of the frame possibility of distortion of the shape of the mantle when pulled lengthwise is eliminated.

Figure 11:
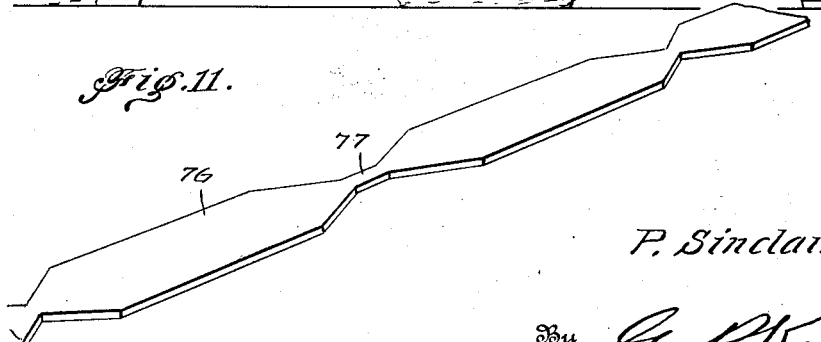
Fig. 11 represent a fragmental perspective view of a modified type of form.

The modification of the invention illustrated in Figs. 9 and 10 is adapted for use in connection with the modified type of flat form chain illustrated in detail in Fig. 11. In the modification, the frame structure 72 which is adapted to be supported upon the horizontal supporting bar sections 38, in lieu of the take-up mechanism 33, is provided with parallel horizontal shafts 73 supporting flat closely arranged feed rollers 74, in position immediately above the opening 42 of the former 41, which rollers are to be driven from the take-up mechanism in the same manner in which the type of the invention first described is driven. The socket receiving the terminal of one of the bar sections 38 is indicated by the numerals 75 and is connected with a cross piece 72ª having reduced extremities pivotally mounted in the frame 72 and secured in adjusted position by screws 75ª. One of the roller supporting shafts 73 is mounted in an adjustable bearing secured in position by a screw 73ª, this construction provides for a take-up mechanism 33″ adapted to be interchangeably supported on the frame 38 in lieu of the take-up mechanism 33, and which is to be used in connection with the take-up mechanism 33′.

The chain of forms 76 adapted for use in connection with the modified type of form feeding mechanism is preferably formed of paper or equivalent flexible and inexpensive material and consists of a plurality of forms connected by the restricted portions 77.

Owing to the flat shape of the forms 76 the latter are capable of being passed between the rollers 37 of the take-up mechanism 33 and consequently the guide pulley 52 and take-up mechanism 33 as illustrated in Fig. 1 may be dispensed with.

In the operation of the modified type of the invention, the terminal of the chain of forms 76 is entered in the tubular braid, passed upwardly between the feed rollers 74 on the frame 72 and thence laterally of the vertical axis of the machine and between the rollers 37 of the usual take-up mechanism.

From the foregoing it is evident that by the use of the improved attachment, a long series of mantle foundations or frames may be produced which may be subsequently cut apart to form individual mantle frames each provided with a perfected shaped head portion adapted to engage a preferred type of supporting bail.

What I claim is:

1. In a machine of the class described, a base, a frame carried by said base and overlying the same, a series of separably connected forms, interchangeable take-up mechanisms adapted to be supported on said frame medially of said base for drawing said forms vertically of the latter, and means carried by said frame for drawing said forms laterally of the base after the operation of the take-up mechanism.

2. In a machine of the class described, a base, a frame carried by said base and overlying the same, a series of separably connected forms, interchangeable take-up mechanisms adapted to be supported on said frame medially of said base for drawing said forms vertically of the latter, and a second take-up mechanism carried at one side of said frame for drawing said forms laterally of said base after the operation of the said first mentioned take-up mechanism.

In testimony whereof I affix my signature hereto.

PAUL SINCLAIR.